(12) United States Patent
Miwa et al.

(10) Patent No.: US 6,461,517 B1
(45) Date of Patent: Oct. 8, 2002

(54) BACTERIAL-DERIVED COMPONENT REMOVAL MATERIAL

(75) Inventors: Keishi Miwa, Takatsuki; Mayumi Fukuyama, Kusatsu; Rumiko Ishii, Sunto-gun, all of (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/622,219

(22) PCT Filed: Dec. 20, 1999

(86) PCT No.: PCT/JP99/07146

§ 371 (c)(1),
(2), (4) Date: Aug. 15, 2000

(87) PCT Pub. No.: WO00/37172

PCT Pub. Date: Jun. 29, 2000

(30) Foreign Application Priority Data

Dec. 22, 1998 (JP) .......................................... 10-365621
Dec. 22, 1998 (JP) .......................................... 10-365622

(51) Int. Cl.$^7$ .......................... A61M 1/36; A61L 15/44; A61F 13/00
(52) U.S. Cl. .................. 210/690; 210/198.1; 604/5.04; 604/6.09
(58) Field of Search ................................ 210/632, 645, 210/646, 692, 198.2, 690, 691, 198.1; 435/177, 179, 180, 182, 268, 269; 604/5.02, 5.04, 6.09; 530/415, 812, 815, 817

(56) References Cited

U.S. PATENT DOCUMENTS

| | | | |
|---|---|---|---|
| 4,436,624 | * | 3/1984 | Kreuzburg et al. |
| 6,258,275 | * | 7/2001 | Freitag |
| 6,337,368 | * | 1/2002 | Kobayashi et al. |

FOREIGN PATENT DOCUMENTS

| | | |
|---|---|---|
| JP | 7-284660 | 10/1995 |
| JP | 10-147533 | 6/1998 |

OTHER PUBLICATIONS

Translation of JP–10–147,533, Translated by FLS, Inc., Jan. 2002.*

Jaber: "Removal of Cytokine Inducing Substances by Polymyxin–B Immobilized Polystyrene–Derivative Fibers During In Vitro Hemoperfusion of 10% Human Plasma Containing *Staphylococcus aureua* Challenge," pp. 48–53, *ASAIO Journal* 1998.

* cited by examiner

Primary Examiner—David A. Simmons
Assistant Examiner—Fred Prince
(74) Attorney, Agent, or Firm—Nixon & Vanderhye P.C.

(57) ABSTRACT

A material having affinity for LTA and/or PrA and/or aHL and/or proteinase is prepared by introducing functional groups capable of hydrogen bond formation into a substrate. Using this material, LTA and/or PrA and/or aHL and/or proteinase in blood, plasma or other solution of high protein concentration can be rapidly detoxified or removed. Articles for LTA and/or PrA and/or aHL and/or proteinase removal of detoxification using this material are described, in particular a body fluid purification column for LTA and/or PrA and/or aHL and/or proteinase removal and an LTA and/or PrA and/or aHL and/or proteinase-adsorptive dressing.

40 Claims, No Drawings

BACTERIAL-DERIVED COMPONENT REMOVAL MATERIAL

TECHNICAL FIELD

The present invention relates to a material having selective affinity for compounds produced by prokaryotic microorganisms, namely gram-negative bacteria and gram-positive bacteria. From among the compounds produced by bacteria, it relates to a material which removes or results in a loss of toxic activity (detoxification) of lipoteichoic acid (hereinafter abbreviated to LTA), protein A (hereinafter abbreviated to PrA), α-hemolysin (abbreviated to aHL) or proteinase. In particular, since it binds to the LTA and/or PrA and/or aHL and/or proteinase occurring in blood and other such solutions of high protein concentration, it is ideally used either as a medicinal agent which brings about a loss of the toxic activity (detoxification) of LTA and/or PrA and/or aHL and/or proteinase, or as a purification column or dressing which removes LTA and/or PrA and/or aHL and/or proteinase.

TECHNICAL BACKGROUND

In recent years, as a result of a variety of studies, LTA has come to be regarded as one of the causal substances of gram-positive bacterial sepsis. For example, it has been reported that it induces expression of nitric oxide synthase in cultured vascular smooth muscle cells (J. Cardiovasc. Pharmacol., 20, S145–S147 (1992)), that as a result of intravenous infusion in rats there occurs a reduction in blood pressure and a reduction in the pressor reaction due to noradrenaline (Br. J. Pharmacol, 144, 1317–1323 (1995)), that as a result of intrathoracic administration to animals, neutrophil infiltration into the thoracic cavity is observed and pleurisy occurs (JP-A-9-163896) and, furthermore, that if LTA and peptidoglycan are jointly administered to rats, shock and internal organ disturbances occur (J. Exp Med., 188 (2), 305–315 (1998)). By way of contrast, it has been reported that nitric oxide production is inhibited by anti-mouse CD14 antibodies (Biochem Biophys Res Commun, 233 (2), 375–379 (1997)) or by N(omega)-nitro-L-arginine methyl ester (Infect Immun, 65 (6), 2074–2079 (1997)), and that platelet activating factor antagonist inhibits shock deaths resulting from LTA administration to mice (JP-A-9-208493). Furthermore, the effects of aminoguanidine and dexamethasone (Br J Pharmacol. 119 (7), 1411–1421 (1996)) have also been investigated. However, these all target substances produced in the latter part of the inflammatory response initiated by LTA and there are no reports of drugs which target the LTA itself. Now, regarding materials for medical use, there is a report (ASAIO J, 44 (1), 48–53 (1998)) that fibre-immobilized polymyxin-B brings about a 20% reduction in the TNF-α production due to a Staphylococcus aureus culture supernatant (diluted with 10% human plasma-containing medium). However, various toxins are contained in the culture supernatant and LTA removal has not been confirmed. Moreover, the percentage removal was also low, at 20%. Thus, there have not been known hitherto materials which have a high affinity for LTA in high protein solutions such as plasma.

In addition, it is known that, as a result of the agglomeration brought about by PrA binding to immunoglobulin G (hereinafter abbreviated to IgG), which is the main protein of the human immune system, deactivation of the activity thereof is brought about. As a result of the IgG deactivation and a lowering of the immune capability, bacteria readily invade the body and sepsis is aggravated. In the same way, aHL is a protein which harms cells by bringing about the formation of pores in the cell membranes of human cells (particularly blood corpuscles) and, by destroying cells, there is created a situation where infection readily occurs and sepsis is aggravated. No materials are known which have a characteristic affinity for such toxins, PrA and aHL.

OBJECTIVE OF THE INVENTION

The present invention relates to a material which resolves these prior-art problems and also has further novel functions, and its objective is to provide a material which can rapidly bring about a loss of toxic activity (detoxification) of, or can remove, the LTA and/or PrA and/or aHL and/or proteinase in blood or other such solutions of high protein concentration.

Specifically, the material of the present invention has a high affinity for bacterially-derived components and binds LTA and/or PrA and/or aHL and/or proteinase present in blood, plasma and other such body fluids, or in pharmaceutical preparations and, it this way, it is possible to detoxify the activities of these toxins and to treat and prevent sepsis and infectious diseases. Moreover, where this material is water-insoluble, there can then be provided a material which adsorbs LTA and/or PrA and/or aHL and/or proteinase present in blood, plasma and other such body fluids, or in drugs, by binding such toxins, and by employing such a material there can be provided a blood purification column or a wound dressing for the treatment or prevention of sepsis or infectious disease.

DISCLOSURE OF THE INVENTION

The present invention has the following constitution for resolving the problems described above.

(1) A bacterially-derived component detoxification or removal material which is characterized in that it has at least one functional group capable of hydrogen bond formation and detoxifies or removes at least one of the bacterially-derived components selected from lipoteichoic acid, protein A, α hemolysin proteinase and endotoxin.

(2) A bacterially-derived component detoxification or removal material which is characterized in that it has a functional group capable of hydrogen bond formation and a hydrophobic group and/or ether bond, and it detoxifies or removes at least one of the bacterially-derived components selected from lipoteichoic acid, protein A, α hemolysin, proteinase and endotoxin.

(3) A material for sepsis treatment where a material according to (1) and (2) is employed.

(4) A wound dressing employing a material according to (1) and (2).

(5) A method for the removal or detoxification of lipoteichoic acid and/or protein A and/or a hemolysin and/or proteinase in liquids, using a material according to (1) and (2).

OPTIMUM FORM FOR PRACTICING THE INVENTION

In the present invention, LTA refers to a substance from which the cell membrane and cell wall of gram-positive bacteria such as bacteria of the genera Streptococcus, Micrococcus, Lactobacillus, Staphylococcus, Bacillus and Enterococcus are composed ("Ika Saikingaku [Medical Bacteriology]", Ed. by Masanosuke Yoshikawa, Published by Nankodo). Furthermore, PrA and aHL are proteins produced by Staphylococcus aureus. Again, in the present invention, proteinase refers to bacterially-derived proteinase which cleaves partial sequences from protein precursors, producing active proteins. These bacterially-derived components are toxins which are highly likely to be involved in the aggravation of infectious diseases, in particular sepsis.

In addition, it is suspected that there is a relationship between streptolysin, coagulase, enterohemorrhagic toxin, pseudomonas exotoxin A, cholera toxin, botulinus toxin, verotoxin, leukocidin, superantigen, endotoxin and the like, and the aggravation of infectious diseases, in particular, sepsis. Of these, superantigen and endotoxin are highly toxic and the detoxification or removal of these toxins is desirable at the same time as that of LTA, PrA and aHL.

In the present invention, there are no particular restrictions on the functional groups capable of hydrogen bond formation, and examples are the urea bond, thiourea bond, urethane bond, amide group, amino group, hydroxyl group, carboxyl group, aldehyde group, mercapto group and guanidino group, but possession of at least one urea bond, thiourea bond, amide bond, amino group or hydroxyl group is preferred. There are no particular restrictions on the structure adjoining the group capable of forming a hydrogen bond, and there can be employed aliphatic compounds such as propane, hexane, octane and dodecane, or alicyclic compounds such as cyclohexane and cyclopentane but, taking into consideration their high affinity, aromatic compounds such as benzene, naphthalene or anthracene are more preferably used. Derivatives such as bromoheptane, chlorocyclohexane, methylbenzene, chlorobenzene, nitrobenzene, diphenylmethane and chloronaphthalene are also suitably employed. Again, it is further preferred that there be at least two groups capable of hydrogen bond formation and, in particular, there is preferably employed a structure which also possesses a functional group capable of forming a hydrogen bond, such as an amino group, hydroxyl group or carboxyl group, as the structure adjoining the urea bond, thiourea bond or amide bond. As examples of compounds with an amino group, there are aminohexane, monomethylaminohexane, dimethylaminohexane, aminooctane, aminododecane, amino-diphenylmethane, 1-(3-aminopropyl)imidazole, 3-amino-1-propene, aminopyridine, aminobenzenesulphonic acid, tris(2-aminoethyl)amine and the like, more preferably diaminoethane, diethylenetriamine, triethylenetetramine, tetraethylenepentamine, dipropylenetriamine, polyethyleneimine, N'-methyl-2,2'-diaminodiethylamine, N-acetylethylenediamine, 1,2-bis(2-aminoethoxyethane) and other such compounds with a plurality of amino groups (sometimes referred to as polyamines). Again, as examples of compounds with a hydroxyl group, there can be used hydroxypropane, 2-ethanolamine, 1,3-diamino-2-hydroxypropane, hydroxybutanone, hydroxybutyric acid, hydroxypyridine and the like, glucides such as monosaccharides, oligosaccharides and polysaccharides such as lucose, glucosamine, galactosamine, maltose, cellobiose, sucrose, agarose, cellulose, chitin, chitosan and the like, and derivatives of these. Furthermore, as examples of structures with a carboxyl group, there can be used β-alanine, n-caproic acid, isobutyric acid, γ-amino-β-hydroxybutyric acid and the like. Most preferably, there can be used as the material of the present invention a compound both an aromatic group and a compound capable of forming a hydrogen bond as structures adjoining the urea, thiourea or amide groups.

As a functional group other than a group capable of forming a hydrogen bond, it is preferred that there be present a hydrophobic group or ether bond. Hydrocarbons with at least 4 carbons and aromatic rings are preferred as the hydrophobic group, and they are effective without distinction in terms of being linear, branched, cyclic, saturated or unsaturated. Specific examples are the n-butyl group, sec-butyl group, tert-butyl group, isobutyl group, n-hexyl group, n-octyl group, n-dodecyl group, cyclohexyl group, benzyl group, 3,3-diphenylpropyl group n-butylamino group, n-hexylamino group, n-dodecylamino group, n-hexadecylamino group and the like.

As the hydrophobic group, it is preferred that it have log P value at least 0.7 (P=partition coefficient in an octanol/water system). It is possible to refer to the published values of a number of known compounds (see Albert Leo, Corwin Hansh and David Elkins, Partition coefficients and their uses, Chemical Reviews, vol.71, No.6 p525–616 (1971)).

As examples of structures containing an ether bond or ether bonds, there are straight chain ethers such as the ethoxyethyl group and methoxyethyl group, cyclic ethers such as crown ethers, and the ethers contained in glucides such as cellulose, agarose and the like.

Furthermore, it is also possible to use polyureas, polythioureas and polyamides, which contain a plurality of urea bonds, thiourea bonds and amide bonds in the molecular structure, as the material of the present invention. Here too, any of the aforesaid structures can be used as structures adjoining the urea bonds, thiourea bonds or amide bonds, but it is most preferred that there be used both an aromatic compound and a group (or groups) capable of forming a hydrogen bond, such as a compound which possess hydroxyl, amino or carboxyl groups (including glucides or derivatives thereof).

Moreover, the material of the present invention may also be either monomer, oligomer or polymer, so material where an aforesaid structure or part thereof has been polymerized is also included in the materials of the present invention. Thus, as the aforesaid structure or part thereof, there can be suitably employed synthetic polymers such as nylon, polymethyl methacrylate, polysulphone, polystyrene, polyethylene, polyvinyl alcohol, polytetrafluoroethylene and the like, or natural polymers including cellulose, collagen, chitin, chitosan and derivatives of these, etc. That is to say, there is ideally carried out the introduction of groups capable of hydrogen bond formation into homopolymer, copolymer or blended such synthetic polymers or natural polymers. Furthermore, there can also be appropriately used an inorganic material such as metal, ceramic or glass which has been covered by a suitable polymer. The term carrier in the present invention denotes a support on which the material of the present invention is fixed, and it may be for example a synthetic polymer or natural polymer as exemplified above.

The material of the present invention can be synthesized by generally-known methods. For example, in the case where a urea bond or thiourea bond is introduced into an aliphatic compound or an aromatic compound, there can be used the method of performing reaction between an amino compound and an isocyanate compound or isothiocyanate compound. Furthermore, in the case of the introduction of an amide group into an aliphatic compound or aromatic compound, there can be used for example the method of performing reaction between an acid, acid chloride or acid anhydride and an amino compound. Any mixing ratio of amino compound and isocyanate compound, isothiocyanate compound, acid, acid chloride or acid anhydride can be selected but, normally, there is desirably used 0.1 to 10 mol of the amino compound per 1 mol of the isocyanate compound, isothiocyanate compound, acid, acid chloride or acid anhydride. As the isocyanate compound or isothiocyanate compound, there can be used any aliphatic isocyanate compound or isothiocyanate compound such as, for example, ethyl isocyanate, stearyl isocyanate, n-butyl isocyanate, iso-butyl isocyanate, n-propyl isocyanate, methyl isothiocyanate, ethyl isothiocyanate, n-butyl isothiocyanate, benzyl isothiocyanate, hexamethylene diisocyanate, cyclohexyl isocyanate, cyclohexyl isothiocyanate, cyclohexyl isothiocyanate, cyclohexyl diisocyanate and the like, but more preferably there is used an aromatic isocyanate compound or isothiocyanate compound such as phenyl isocyanate, chlorophenyl isocyanate, fluorophenyl isocyanate, bromophenyl isocyanate, nitrophenyl isocyanate, tolyl isocyanate, methoxyphenyl isocyanate, 1-naphthyl isocyanate, 4,4'-diphenylmethane diisocyanate, 3,3,5,5'-tetraethyl-4,4'-diisocyanatodiphenylmethane, phenyl isothiocyanate, chlorophenyl isothiocyanate, fluorophenyl isothiocyanate, nitrophenyl isothiocyanate, tolyl isothiocyanate, methoxyphenyl isothiocyanate, 1-naphthyl isothiocyanate and the like. As the acid chloride, there can be used any aliphatic acid chloride such as, for example, isovaleryl chloride, stearoyl chloride, cyclohexanecarbonylchloride, 6-chloronicotinyl chloride and the like but, more preferably, there can be used aromatic acid chlorides such as benzoyl chloride, 3,4-dichlorobenzoyl chloride, nitrobenzoyl chloride, 4-chlorobenzoyl chloride, 4-toluoyl chloride, benzo-[b]thiophene-2-carbonyl chloride and the like. Again, as the acid anhydride, there can desirably be used acetic anhydride, succinic anhydride, phthalic anhydride, benzoic anhydride and the like. Furthermore, the amino group in the amino compounds used in the present invention can be a primary amino group, secondary amino group or tertiary amino group and, as the amino compound, there can desirably be used, for example, ammonia, sec-octylamine, 1-(3-aminopropyl)imidazole, 3-amino-1-propene, aminopyridine, aminobenzenesulphonic acid, tris(2-aminoethyl)amine and the like. Again, there can also be used advantageously a polyamino compound or an amino compound which possesses a hydroxyl group or carboxyl group, such that it is possible to introduce a group or groups capable of forming a hydrogen bond in addition to the urea, thiourea or amide bonds. As the polyamino compound, there can be used any of, for example, diaminoethane, diethylenetriamine, triethylenetetramine, tetraethylenepentamine, dipropylenetriamine, N'-methyl-2,2'-diaminodiethylamine, polyethyleneimine, N-acetyl-ethylenediamine, 1,2-bis(2-aminoethoxy)ethane and the like. As an amino compound with a hydroxy group, there can be used 2-ethanolamine, 3-propanolamine, 6-hexanolamine, 1,3-diamino-2-hydroxypropane, 2-(2-aminoethoxy)ethanol, 2-(2-aminoethylamino)ethanol, glucamine, N-methyl-1,3-diaminopropanol or other such aliphatic amine, or 4-aminophenol, diaminophenol, aminohydroxypyrimidine, diaminohydroxypyrimidine, diaminohydroxypyrazole or other such aromatic amine, or serine, tyrosine or other such amino acid. Again, by the reaction of epichlorohydrin and an amino compound, or 1,3-dibromo-2-hydroxypropane with a compound having only an amino group it is possible to synthesize an amino compound with a hydroxyl group from a compound having only a hydroxyl group, or a compound only having an amino group. Furthermore, it is possible to use the same methods as above in the case where a group capable of forming a hydrogen bond is introduced into a glucide. That is to say, in the case of a glucide with an amino group or amino groups such as chitosan or glucosamine, reaction can be carried out as described above with isocyanate compounds, isothiocyanate compounds, acids, acid chlorides or acid anhydrides. In the case of a glucide which does not possess amino groups, amino groups can be introduced by activating hydroxyl groups in the glucide with epichlorohydrin or tresyl chloride, and then reacting with ammonia, diaminoethane or the like. By utilizing such amino groups, it is then possible to introduce groups capable of forming hydrogen bonds such as urea bonds, thiourea bonds, amide bonds or the like into the glucide. As amino compounds with a carboxyl group, there can be used for example β-alanine, 4-amino-n-butyric acid, γ-amino-β-hydroxy-n-butyric acid, 6-amino-n-caproic acid or the like.

Furthermore, in the case where the material of the present invention is an oligomer or polymer, there is preferably used the method of performing reaction between the amino group of a compound with a group which possesses a hydrogen bond forming capability with oligomer or polymer which has isocyanate groups, carboxyl groups or carboxylic acid active ester groups such as succinimide groups. Reacting an aforesaid isocyanate compound, isothiocyanate compound, acid, acid chloride or acid anhydride with an amino group-possessing oligomer or polymer, or oligomer or polymer in which amino groups have been introduced using ammonia, diaminoethane, 1,3-diaminopropane, 1,3-diamino-2-hydroxypropane, 1,2-bis(2-aminoethoxy)ethane, tris(2-aminoethyl)amine, 2-(2-aminoethylamino)ethanol or the like, is also a preferred method. Furthermore, controlling the reaction time, reaction temperature or mixing ratio, etc, or using protective groups, so that the acid chloride or isocyanate compound does not react with a group or groups capable of forming a hydrogen bond, other than the amino group or groups, is desirable. Where required, functional groups such as amino groups, isocyanate groups, carboxyl groups or carboxylic acid active ester groups such as succinimide groups can be introduced into the oligomer or polymer.

Moreover, in the case where the material of the present invention is a polyurea or polythiourea, it is possible to use the method of performing reaction between, for example, a polyisocyanate compound or polyisothiocyanate compound and a polyamino compound. Normally, in terms of the amount of reagents, there is desirably used from 0.1 to 10 mol of the polyamine per 1 mol of the polyisocyanate compound or polyisothiocyanate compound. As the polyisocyanate compound or polyisothiocyanate compound there is ideally employed hexamethylene-diisocyanate, cyclohexyldiisocyanate, tolylene diisocyanate, 4,4'-diphenylmethanediisocyanate, 3,3',5,5'-tetraethyl-4,4'-diisocyanatodiphenylmethane, xylene-diisocyanate, methylenebis(4-phenylisothiocyanate) or the like. Again, as the polyamino compound, there can be desirably employed diaminoethane, diaminopropane, 1,3-diamino-2-hydroxypropane, N'-methyl-1,3-diamino-2-propanol, diaminophenol, N,N'-diaminopiperazine, diethylenetriamine, triethylenetetramine, tetraethylene-pentamine, polyethyleneimine, dipropylenetriamine, N'-methyl-2,2'-diaminodiethylamine or the like. Furthermore, in the case where the material of the present invention is a polyamide, there can be used for example the method of polycondensation of a polycarboxylic acid and a polyamine. Again, in the case of polyureas, polythioureas and polyamides, there is also advantageously carried out the method where no polyisocyanate, polyisothiocyanate, polycarboxylic acid, or the like, is used, and each functional group is introduced, one at a time, in turn, to finally obtain the polyurea, polythiourea or polyamide.

Again, the introduction of the hydrophobic group or groups can be carried out by known methods. Thus, preparation can readily be performed by carrying out reaction between a material with an amino group and the halide of the hydrocarbon compound which constitutes the hydrophobic group, for example 1-bromobutane, 1-bromohexane or the like, or by firstly performing activation of the hydroxyl groups of a hydroxyl group compound using epichlorohydrin, tresyl chloride or the like, after which reaction is carried out with the amino derivative of a hydrocarbon compound, for example 1-aminobutane, 1-aminohexane or the like.

Moreover, ether bonds can be introduced by the reaction between bis(2-amino)ethoxyethane, polyoxyethylenebisamine or an amino sugar such as glucosamine and activated ester groups or haloalkyl groups in the material.

All the above reactions are carried out, as a rule, at a reaction temperature of 0 to 150° C. and a reaction time of 0.1 to 24 hours. Furthermore, while it is not absolutely necessary to employ a reaction solvent, in general the reaction is carried out in the presence of solvent. As examples of the solvent, there are methanol, ethanol, isopropyl alcohol, n-butanol, hexane, acetone, N,N-dimethylformamide, dimethylsulphoxide and other such aliphatic hydrocarbons, benzene, toluene, xylene and other such aromatic hydrocarbons, dichloromethane, chloroform, chlorobenzene and other such halogenated hydrocarbons, diethyl ether, tetrahydrofuran, dioxane and other such ethers. Where required, following the end of the reaction, the reaction liquid is subjected to the usual post-treatment such as filtering and concentration, after which it can be purified by column chromatography, recrystallization or other such process. Furthermore, in the case of a water-insoluble material, washing using a glass filter or the like is also a preferred method.

Amongst the materials of the present invention, those that are water insoluble are favourably employed as, for example, a dressing or a column for removing LTA and/or PrA and/or aHL and/or proteinase. The form thereof is not particularly restricted but, in the case where used as a column, a form such as beads, fibre, hollow fibre, fibre bundles, yarn, net, knitted material, woven fabric or the like is preferred. In the case of a dressing, a woven material or film form is preferred. Furthermore, the material need not just be used on its own, but it can also be used as one column or dressing, immobilized on a suitable material or mixed with some other material. The immobilizing or mixing stage, etc, may be carried out prior to, or after, processing in the aforesaid form. In the case where a column employing the material of the present invention is used as a column for extracorporeal circulation, the blood led out from the body may be directly passed through the column or this may be used in combination with a plasma separation membrane or the like.

Below, explanation is provided in further detail using examples, but the content of the invention is not to be restricted to the examples.

DESCRIPTION OF THE PREFERRED EMBODIMENTS

EXAMPLE 1

PREPARATION OF MODIFIED POLYSTYRENE FIBRE

Islands-in-a-sea type composite fibre (thickness: 2.6 denier, number of islands: 16) as described in U.S. Pat No. 4,661,260 (Example 1) comprising 50 weight ratio sea component (mixture of 46 weight ratio of polystyrene and 4 weight ratio of polypropylene) and 50 weight ratio islands component (polypropylene) was reacted for 1 hour at 20° C. with a solution mixture of 50 g of N-methylol-α-chloroacetamide, 400 g of nitrobenzene, 400 g of 98% sulphuric acid and 0.85 g of paraformaldehyde. Then, the fibre was washed with nitrobenzene and introduced into water, to halt the reaction. Thereafter, by further washing the fibre with hot water, there was obtained chloroacetamidomethylated crosslinked polystyrene (hereinafter referred to as AMPSt).

The reagent shown in Table 1 was dissolved in 50 ml of N,N-dimethylformamide (hereinafter abbreviated to DMF). To the solution obtained, there was added 1 g of the AMPSt fibre (equivalent to a chloro content of 2 mmol) while stirring. Reaction was carried out at 30° C. for 3 hours. Subsequently, washing was conducted on a glass filter using 200 ml of DMF and 200 ml of distilled water.

In this way, there were respectively produced materials with amino groups (a)(b), amino groups and ether groups (c), amino groups and hydroxyl groups (d), and amino groups and hydrophobic groups (e) to (h), introduced into a carrier fibre having amide bonds.

In addition, prior to washing aforesaid materials (a) to (h) with distilled water, they were also respectively added to a solution comprising 0.19 g of 4-chlorophenylisocyanate dissolved in 50 ml of DMF, and reaction was carried out for 1 hour at 25° C. Thereafter, washing was carried out on a glass filter using 200 ml of DMF and 200 ml of distilled water, and the amino groups converted to urea derivatives. (a2) to (h2)

TABLE 1

| Reagents used for Reaction with AMPst Fibre | | |
|---|---|---|
| Reaction Product | Reagent Employed in the Reaction | Amount of Reagent (g) |
| (a) | tetraethylenepentamine | 0.3 |
| (b) | ethylenediamine | 0.3 |
| (c) | 1,2-bis(2-aminoethoxy)ethane | 0.8 |
| (d) | 1,3-diamino-2-hydroxypropane | 0.5 |
| (e) | n-butylamine | 0.8 |
| (f) | n-hexylamine | 0.8 |
| (g) | n-octylamine | 0.8 |
| (h) | n-hexadecylamine | 0.8 |

EXAMPLE 2

Introduction of Urea Groups, Thiourea Groups and Amide Groups into Chitosan Beads 12 ml (volume when precipitated; dry weight 1.0 g) of chitosan beads of diameter 0.1 mm (produced by Fujibo (Ltd), "Chitopearl"AL-01) were stirred in 50 ml of DMF, and then the beads and solvent separated by means of a glass filter. This procedure was carried out 20 times, for 5 minutes per time, and the water component content completely replaced by DMF.

The beads were then slowly added to a solution of the reagent shown in Table 2 dissolved in 100 ml of DMF and reaction carried out for 1 hour at room temperature, while stirring. Subsequently, using a glass filter, the beads and solution were separated and the beads washed by stirring for 5 minutes in 50 ml of DMF. This washing procedure was repeated 20 times, and unreacted reagent completely removed. Next, the washing procedure was carried out in the same way by means of distilled water, to replace the DMF with distilled water and, in this way, chitosan beads containing urea bonds, thiourea bonds or amide bonds were obtained.

TABLE 2

| Reaction Product | Reagent Employed in the Reaction | Amount of Reagent (g) |
|---|---|---|
| (i) | 4,4'-diphenylmethanediisocyanate | 0.7 |
| (j) | 4-chlorophenyl isothiocyanate | 0.5 |
| (k) | 4-chlorobenzoyl chloride | 0.5 |

EXAMPLE 3

Introduction of Amino Groups and Hydrophobic Groups into Cellulose Beads

Water was added to 200 ml of cellulose beads of diameter 0.1 mm (produced by the Chisso Corporation, "Cellofine GCL-700 m") until the volume was 400 ml, after which 40 ml of 5N aqueous sodium hydroxide solution was added, then 50 ml of epichlorohydrin added and reaction carried out for 6 hours at 40° C. After the reaction, the beads were washed with 3000 ml of distilled water on a glass filter and there was obtained cellulose beads with epoxy groups introduced (EPO).

10 ml of the EPO beads was slowly added to a solution of the reagent shown in Table 3 dissolved in 100 ml of a 50% (v/v) aqueous ethanol solution and, while stirring, reaction was carried out for 7 days at 50° C. Subsequently, using a glass filter, the beads and solution were separated, and the beads washed with 500 ml of 50% (v/v) aqueous ethanol solution and then with 500 ml of distilled water, to completely remove unreacted reagent. In this way, amino groups and hydrophobic groups were introduced into the cellulose beads to give the following structure.

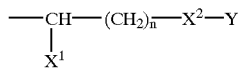

$X^1$=OH and $X^2$=NH.

| | | |
|---|---|---|
| Y = $(CH_2)_3CH_3$ | (l) | |
| = $(CH_2)_5CH_3$ | (m) | |
| = $(CH_2)_7CH_3$ | (n) | | n=1

TABLE 3

| Reaction Product | Reagent Used in the Reaction | log P | Amount of Reagent (g) |
|---|---|---|---|
| (l) | n-butylamine | 0.77 | 0.7 |
| (m) | n-hexylamine | 1.93 | 0.5 |
| (n) | n-octylamine | 2.90 | 0.5 |

EXAMPLE 4

Test to Remove LTA, PrA, aHL, Proteinase, Endotoxin and Superantigen by Means of the Modified AMPSt Fibre Modified Chitosan Beads and Modified Cellulose A test was carried out of the adsorption and removal of LTA, PrA, aHL, proteinase, endotoxin and superantigen by means of the modified AMPSt fibre prepared in Example 1, the modified chitosan beads prepared in Example 2 and the modified cellulose beads prepared in Example 3. The LTA was derived from Staphylococcus aureus (obtained from the Sigma Co.); the PrA was obtained from the Prozyme Co.; the endotoxin (hereinafter abbreviated to Et) was standard product derived from E. coli strain 0111B4 (obtained from the Difco Co.); and the proteinase, namely SPEB, and the aHL and TSST-1 were obtained from the Toxin Technology Co. The removal test was conducted using rabbit plasma. Blood was taken from rabbit using an anticoagulant, and the plasma was obtained by centrifuging for 15 minutes at 3,000 rpm. The plasma was heated for 2 hours at 56° C. and heat-inactivated plasma prepared. This plasma was filtered with a 0.45 μm fine diameter membrane filter, after which LTA, PrA, aHL, SPEB, Et and TSST-1 were added at concentrations of 10 μg/ml respectively. 35 mg of the modified AMPSt fibre of Table 1, 0.1 ml (precipitated volume) of the modified chitosan beads of Table 2 or 0.1 ml (precipitated volume) of the modified cellulose beads were respectively added to 0.5 ml of the LTA-added serum, and shaking performed for 2 hours at 37° C. The concentrations of the bacterially-derived components in the solution after 2 hours were measured by an enzyme immunological measurement method (LTA, PrA, aHL, SPEB, TSST-1) or by using Limulus reagent (obtained from Wako Pure Chemical Industries). The results are shown in Table 4. These results indicate that, unlike a material such as polystyrene which does not possess groups capable of forming hydrogen bonds, the materials with a hydrogen bond forming capability such as urea bonds, thiourea bonds, amide bonds, amino groups or hydroxyl groups remove, at the same time, from one to five of LTA, PrA, aHL, SPEB, Et and TSST-1. Furthermore, hydrophobic groups and ether bonds show an effect in promoting the removal ability. Again, it is apparent that, where the log P value of the hydrophobic group is at least 0.7, it is possible to add a bonding capacity in terms of LTA, PrA, aHL, SPEB, Et or TSST-1.

Now, Table 4 shows the percentage removal Ar calculated, from the concentration ($C_0$) of the toxin prior to the removal test and the concentration (C) after removal, by means of formula 1.

$$Ar=(C_0-C)/C_0 \quad \text{Formula 1}$$

TABLE 4

Test to remove LTA, PrA, aHL, proteinase, endotoxin or superantigen by means of the modified AMPSt fibre and modified chitosan

| | LTA (%) | PrA (%) | aHL (%) | SPEB (%) | Et (%) | TSST-1 (%) |
|---|---|---|---|---|---|---|
| unmodified fibre | 0 | 0 | 0 | 0 | 0 | 0 |
| (a) | 85 | 25 | 32 | 47 | 70 | 48 |
| (b) | 53 | 33 | 18 | 43 | 53 | 40 |
| (c) | 48 | 23 | 18 | 39 | 42 | 37 |
| (d) | 41 | 17 | 20 | 51 | 38 | 53 |
| (e) | 12 | 20 | 18 | 38 | 20 | 42 |
| (f) | 50 | 14 | 12 | 39 | 49 | 35 |
| (g) | 82 | 10 | 9 | 32 | 60 | 28 |
| (h) | 78 | 21 | 13 | 30 | 59 | 46 |
| (a2) | 84 | 62 | 78 | 93 | 62 | 86 |
| (b2) | 65 | 56 | 74 | 89 | 40 | 81 |
| (c2) | 62 | 52 | 79 | 78 | 25 | 80 |
| (d2) | 67 | 61 | 39 | 96 | 19 | 82 |
| (e2) | 13 | 24 | 21 | 75 | 14 | 76 |
| (f2) | 25 | 38 | 24 | 78 | 17 | 63 |
| (g2) | 42 | 46 | 38 | 67 | 32 | 49 |
| (h2) | 58 | 51 | 41 | 58 | 30 | 58 |

TABLE 4-continued

Test to remove LTA, PrA, aHL, proteinase, endotoxin or superantigen by means of the modified AMPSt fibre and modified chitosan

| | LTA (%) | PrA (%) | aHL (%) | SPEB (%) | Et (%) | TSST-1 (%) |
|---|---|---|---|---|---|---|
| unmod. chitosan | 5 | 2 | 8 | 3 | 27 | 6 |
| (i) | 95 | 53 | 72 | 96 | 54 | 89 |
| (j) | 58 | 62 | 62 | 85 | 48 | 80 |
| (k) | 52 | 45 | 52 | 71 | 42 | 69 |
| unmod. PS beads | 0 | 0 | 0 | 0 | 0 | 0 |
| unmod. cell beads | 6 | 2 | 0 | 6 | 0 | 4 |
| (l) | 31 | 36 | 11 | 23 | 10 | 12 |
| (m) | 55 | 50 | 34 | 37 | 15 | 33 |
| (n) | 80 | 42 | 77 | 90 | 21 | 84 | unmodified fibre = unmodified polystyrene composite fibre
unmod. chitosan = unmodified chitosan beads
unmod. PS beads = unmodified polystyrene beads
unmod. cell beads = unmodified cellulose beads

EXAMPLE 5

LTA PrA, aHL, SPEB, Et, TSST-1; Removal Test by Means of Modified AMPSt Fibre (circulatory method)

LTA, PrA, aHL, SPEB, Et and TSST-1 removal tests were conducted using the modified AMPSt fibre (a2) of Example 1, by means of a circulatory method. 1 g of fibre was introduced into a column in each case, and Table 5 shows the LTA concentration when 10 ml of the rabbit plasma prepared by the method in Example 3 was circulated through the column at 37° C. for 60 minutes at rate of 1 ml/min. Even under extracorporeal circulation type flow conditions, the concentration fell with passage of time and a removal capability was shown.

In the same way as in Example 4, the percentage removal Ar calculated from the concentration of each toxin before the removal test ($C_0$) and the concentration (C) after removal over a given time, by means of formula 1, is shown in the table.

TABLE 5

| | LTA % | PrA % | aHL % | SPEB % | Et % | TSST-1 % |
|---|---|---|---|---|---|---|
| percentage removal prior to circulation | 0 | 0 | 0 | 0 | 0 | 0 |
| percentage removal after 15 minutes | 65 | 56 | 74 | 78 | 40 | 67 |
| percentage removal after 30 minutes | 62 | 52 | 79 | 78 | 51 | 79 |
| percentage removal after 60 minutes | 82 | 57 | 70 | 91 | 62 | 82 |

EXAMPLE 6

Preparation of an Adsorbent Body and the Measurement of the Removal of Bacterially-derived Components and an Antibiotic Using this Adsorbent Body Using the α-chloroacetamidomethylated crosslinked polystyrene fibre prepared in Example 1 (hereinafter referred to as AMPSt), 20 g of this AMPst fibre was added, while stirring, to a liquid comprising 6.3 g of tetraethylenepentamine and 7.2 g of n-butylamine dissolved in 500 ml of DMF. Reaction was carried out for 3 hours at 30° C., after which the reacted fibre was washed on a glass filter using 500 ml of DMF. Furthermore, this fibre was added to a solution of 2.3 g of 4-chlorophenylisocyanate dissolved in 500 ml of DMF, and reaction carried out for 1 hour at 25° C. Thereafter, washing was carried out on the glass filter using 1000 ml of DMF and also using 1000 ml of distilled water, and AMPst fibre containing introduced urea bonds was obtained (hereinafter referred to as UAMP fibre).

The removal of bacterially-derived components and an antibiotic using the prepared UAMP fibre was tested. As bacterially-derived components, an adsorption removal test was carried for PrA, aHL, proteinase, endotoxin and superantigen. As the antibiotic there was employed Arbekacin (Meiji Seika Kaisha Ltd., hereinafter abbreviated to as ARK) and as a pressor there was used adrenaline (made by Daiichi Seiyaku). The concentration was measured enzyme-immunologically in the case of the TSST-1, α-hemolysin, protein A and SPEB; by means of the Limulus reagent (Wako Pure Chemical Industries).in the case of the Et; by means of a fluorescence polarization immunoassay method in the case of ARK; and by liquid chromatography in the case of the adrenaline.

The liquid subjected to component removal was produced by dissolving 1 μg/ml of PrA, aHL, TSST-1 and SPEB, 10 μg/ml of LPS, 10 μg/ml of ARK and 100 μg/ml of adrenaline, in 0.1 M sodium phosphate buffer (pH 7.4) containing 0.15 m/l sodium chloride and 5 mg/ml of bovine serum albumin (Fraction V)(produced by the Seikagaku Kogyo Co.). 0.1 g of the UAMP was added to the test liquid and the removal reaction carried out while conducting rotary stirring for 2 hours at 37° C. The concentrations were measured before and after the removal in each case and the percentage removal calculated using aforesaid formula (1). The results are shown in Table 6.

TABLE 6

Test of the Removal of Bacterially-Derived Components and an Antibiotic

| Material Undergoing Removal | Concentration $C_0$ Prior to Removal ng/ml | Concentration after Removal ng/ml | Percentage Removal |
|---|---|---|---|
| α-hemolysin | 1 | 0.38 | 62 |
| protein A | 1 | 0.46 | 54 |
| SPEB | 1 | 0.13 | 87 |
| TSST-1 | 1 | 0.20 | 80 |
| LPS | 10 | 4.2 | 58 |
| ARK | 0.01 | 0.0093 | 7 |
| adrenaline | 100 | 89 | 11 |

Effects of the Invention

By means of the present invention, there is provided a material containing functional groups capable of forming hydrogen bonds, which enables LTA and/or PrA and/or aHL and/or proteinase to be rapidly detoxified or removed in solutions of high protein concentration such as blood plasma. Since it is possible, using the material of the present invention, to bring about loss of toxic activity (detoxification) of LTA and/or PrA and/or aHL and/or proteinase present in pharmaceutical products or in body fluids such as blood and plasma, there becomes possible the treatment or prevention of septic shock, infectious disease and the like. Furthermore, where water-insoluble materials are employed for this material, it is possible to efficiently remove LTA and/or PrA and/or aHL and/or proteinase from within body fluids such as blood or plasma, or drugs, so by producing a column or dressing it becomes possible therewith to treat or prevent septic shock, infections or the like.

What is claimed is:

1. A bacterially-derived component detoxification or removal material having one or more than one functional group capable of hydrogen bond formation and detoxifies or removes at least one of the bacterially-derived components selected from lipoteichoic acid, protein A, α hemolysin and proteinase.

2. A bacterially-derived component detoxification or removal material according to claim 1 where said bacterially-derived component is lipoteichoic acid.

3. A method for the detoxification or removal of lipoteichoic acid from liquid by passing liquid containing lipoteichoic acid through a column packed with material according to claim 2.

4. A bacterially-derived component detoxification or removal material according to claim 1 where said bacterially-derived component is protein A.

5. A method for the detoxification or removal of protein A from liquid by passing liquid containing protein A through a column packed with material according to claim 4.

6. A method for the detoxification or removal of proteinase from liquid by passing liquid containing proteinase through a column packed with material according to claim 4.

7. A bacterially-derived component detoxification or removal material according to claim 1 where said bacterially-derived component is α hemolysin.

8. A method for the detoxification or removal of α hemolysin from liquid by passing liquid containing α hemolysin through a column packed with material according to claim 7.

9. A bacterially-derived component detoxification or removal material according to claim 1 where said bacterially-derived component is proteinase.

10. A method according to any one of claims 4, 7 or 9 wherein the liquid is blood or plasma.

11. A detoxification or removal material according to claim 1 where the bacterially-derived component comprises at least two bacterially derived components selected from lipoteichoic acid, protein A, α hemolysin and proteinase.

12. A method where, by passing liquid containing two or more components selected from lipoteichoic acid, protein A, α hemolysin and proteinase, through a column packed with material according to claim 11, two or more of said components are detoxified or removed from the liquid.

13. A material according to claim 1 wherein the one or more than one functional group capable of hydrogen bond formation is selected from the urea bond, thiourea bond, amide bond, amino group and hydroxyl group.

14. A material according to claim 1 having two or more of said functional groups capable of hydrogen bond formation.

15. A material according to claim 14 having functional groups of different chemical structure capable of hydrogen bond formation.

16. A material according to claim 14 wherein at least one of the groups capable of hydrogen bond formation is an amino group.

17. A material according to claim 16 wherein the amino group is secondary or tertiary.

18. A material according to claim 16 wherein the amino group is a polyamino group.

19. A material according to claim 14 wherein at least one of the groups capable of hydrogen bond formation is a hydroxyl group.

20. A material according to claim 19 wherein the hydroxyl group is glucide-derived.

21. A material according to claim 20 wherein the glucide is selected from chitosan, cellulose and derivatives thereof.

22. A material according to claim 1 having at least one hydrophobic group.

23. A material according to claim 22 wherein the hydrophobic group is a hydrocarbon chain with four or more carbons.

24. A material according to claim 22 wherein the hydrophobic group is an aromatic ring.

25. A material according to claim 22 wherein when the partition coefficient for an octanol/water system is taken as P, log P of the hydrophobic group is 0.5 or more.

26. A material according to claim 22 having two or more types of hydrophobic group.

27. A material according to claim 22 wherein the distance from the group capable of hydrogen bond formation to the hydrophobic group is no more than five atoms.

28. A material according to claim 1 having an ether bond.

29. A material according to claim 28 wherein the ether bond is glucide-derived.

30. A material according to claim 29 wherein the glucide is selected from chitosan, cellulose and derivatives thereof.

31. A material according to claim 1 which comprises a group represented by the following formula:

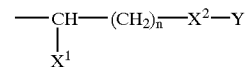

X: functional group capable of hydrogen bond formation, where $X^1$ and $X^2$ may be the same or different Y: an alkyl group with four or more carbons or an aromatic ring n: 0–5.

32. A material according to claim 31 where X is selected from an amino group and a hydroxyl group.

33. A material according to claim 1 including a carrier.

34. A material according to claim 33 wherein the carrier is selected from polystyrene, polysulfone, polymethyl methacrylate, cellulose and chitosan, and derivatives thereof.

35. A material according to claim 33 wherein the carrier is a fiber.

36. A material according to claim 35 the fiber is an islands-in-a-sea fiber.

37. A material according to claim 1 which is water-insoluble.

38. A material according to claim 1 for use in sepsis treatment.

39. A body fluid purification column which comprises a material according to claim 1.

40. A dressing which comprising material according to claim 1.

* * * * *